Patented Aug. 27, 1935

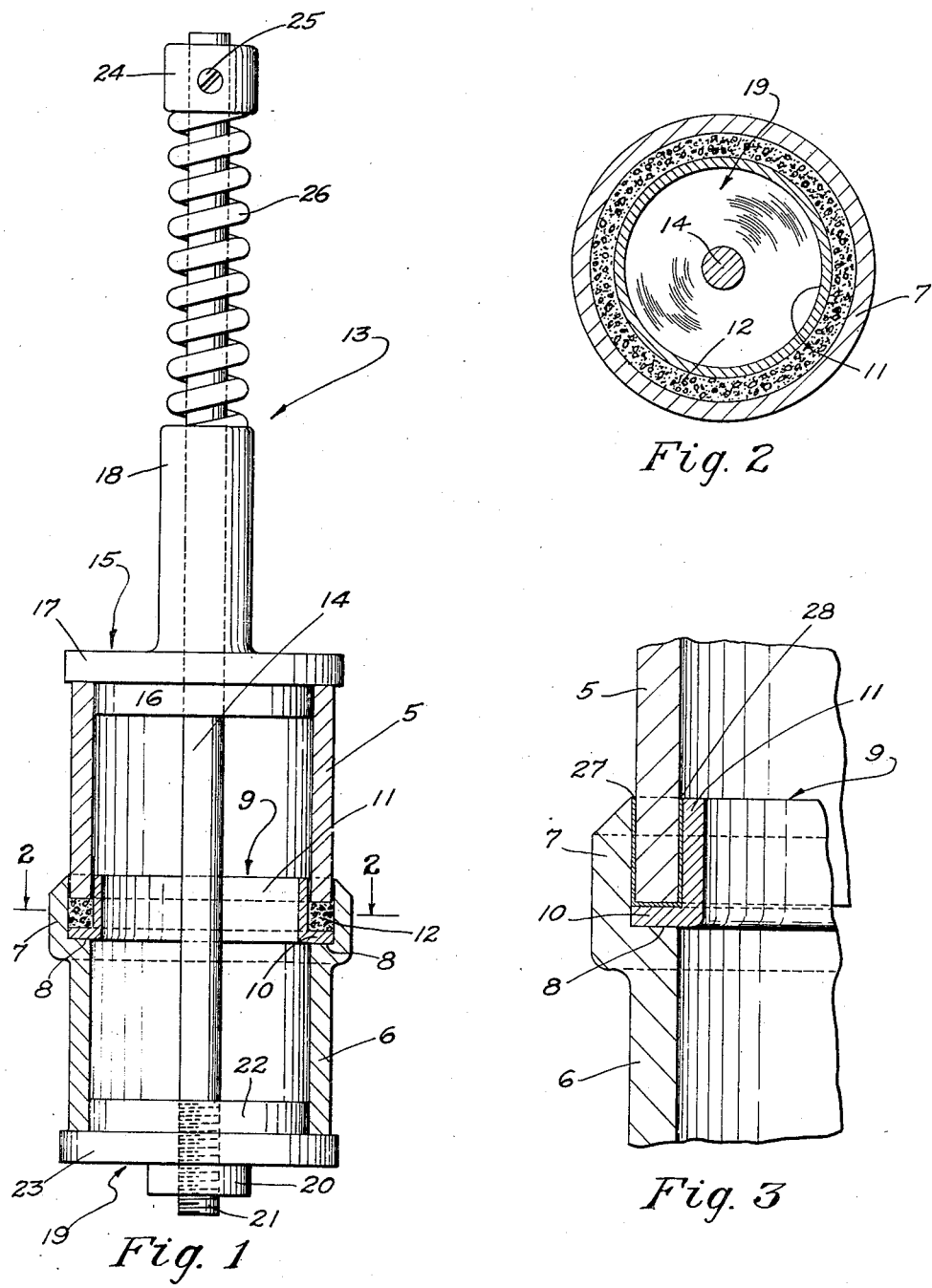

2,012,443

UNITED STATES PATENT OFFICE 2,012,443

BRAZED JOINT AND METHOD OF MAKING

James R. Coe, Watertown, Conn., assignor to The American Brass Company, Waterbury, Conn., a corporation of Connecticut Application June 29, 1933, Serial No. 678,215

6 Claims. (Cl. 113—112)

This invention relates to new and useful improvements in method of and apparatus for brazing and has particular although not exclusive relation to a method of and apparatus for brazing together tubular sections such as the parts of a pipe fitting, for example, the pipe fitting disclosed in my application Serial Number 654,593, filed February 1, 1933.

An object of the invention is to provide a method and means whereby tubular sections may be expeditiously brazed together and whereby a joint of neat appearance and positive value is provided between the connected sections.

Other objects and advantages will become apparent from a consideration of the following detailed description taken in connection with the accompanying drawing wherein a satisfactory embodiment of the invention is shown. However, it will be understood that the invention is not limited to the details disclosed but includes all such variations and modifications as fall within the spirit of the invention and the scope of the appended claims.

In the drawing:

Fig. 1 is a view partly in vertical section and partly in elevation and illustrating a step of my improved method and also showing my improved apparatus in use;

Fig. 2 is a horizontal sectional view taken substantially along the plane of the line 2—2 of Fig. 1; and Fig. 3 is a detail sectional view on an enlarged scale showing a portion of a joint completed according to the present invention.

Referring in detail to the accompanying drawing, at 5 is shown one tubular member or section which is to be brazed to a second tubular member or section 6. This second section includes an enlarged or expanded portion 7 connected with the main portion of the section by an annular shoulder 8 whereby the section 6 is in effect provided at one end with a bell. As suggested in the drawing, the enlarged portion 7 of tube section 6 is adapted to receive or telescope over an end of the section 5.

An annular retaining member or ring 9 is provided and this member 9 includes angularly related portions 10 and 11. The diameter of portion 10 of ring 9 is such that when the ring is inserted in the enlarged end of tube section 6 the said portion of the ring rests on the shoulder 8 with the ring portion 11 in spaced substantially parallel relation to the enlarged portion 7 of the second tube section. According to the present method when the retaining member or ring 9 is positioned in the tubular section 6 as suggested, brazing solder is placed in the space between the retaining member and the enlarged portion of the second section.

This brazing solder may be in the form of a ring or band or it may be in the form of a powder or granular in which case it will be mixed with borax or some other fluxing material and deposited in the indicated space as shown at 12. Next, one end portion of tubular section 5 is inserted into the tubular section 6 so that said end of section 5 rests on or engages the brazing solder as best shown in Fig. 1.

When the parts or members have been thus assembled and preliminary to the actual brazing operation they may be placed in a jig or fixture generally designated 13. This jig or fixture comprises a rod or bar 14 on which is slidably arranged a head 15 comprising a disc-like portion 16 of a diameter to enter a tubular section, and integral with or carried by said head in a flange 17 of a diameter to abut the outer end of a tubular section into which the head snugly enters. If desired, the head 15 may also include an elongated tubular portion 18 through which the rod 14 passes, the said portion 18 providing additional bearing surface whereby the head will have a sliding movement on the rod.

A second head 19 is included in the jig or fixture and is removably mounted on the rod being secured on the rod as by a nut 20 screwed onto the lower or outer threaded end 21 of the rod. Head 19 includes a disc-like portion 22 corresponding to the disc-like portion 16 of the head 15 and head 19 also includes a flange portion 23 which functions the same as the flange 17 of the first described head. Formed with or secured to the upper or inner end of the rod or bar 14 is a collar or enlargement 24 which in the present instance is shown as secured to the rod or bar by a screw 25. Arranged between this collar 24 and the inner or upper end of the elonged tubular portion 18 of the head 15 and bearing at its respective ends against the collar and said portion of the head is a relatively heavy coil spring 26, the function of which will later be fully set forth.

After the tubular sections have been assembled with the retaining member 9 and the brazing solder 12, the assembly is placed in the jig or fixture 13. To accomplish this the head 19 and nut 20 are removed and the rod or bar 14 is passed through the assembly bringing one end of one of the tubular sections into engagement with the head 15. Thereafter, the head 19 is replaced on the bar or rod 14 and the nut 20 is threaded into place. Obviously, the spring 26 constantly tends to expand and therefore constantly presses the head 15 against the tube section 5 so that said section is pressed against the solder 12.

When the parts have been placed in the jig or fixture the latter together with the assembled parts is placed in a furnace and heated to a temperature sufficient to melt the solder at which time the spring 26 forces the tubular sections 5 and 6 together causing the solder to flow upwardly between the inner surface of expanded tube portion 7 and the outer surface of tube section 5, as shown at 27 in Fig. 3, and up between the inner surface of section 5 and the outer surface of the portion 11 of the retaining member or ring 9 as shown at 28.

From Fig. 3 it will be seen that the solder completely encloses the telescoped end portion of the tubular section 5 and that the solder completely fills all space between said end portion of the tube 5 and the retaining member 9 and the expanded portion 7 of the tubular section 6. This provides a double joint of neat appearance and positive value, all of the parts being sealed over all of their overlapping surfaces. After the solder has been forced into place the assembly may be moved from the furnace to permit the solder to cool and harden when the connected or jointed sections may be removed from the jig.

Having thus set forth the nature of my invention, what I claim is:

1. The method of brazing together tubular sections comprising disposing solder between telescoping ends of said sections to be brazed together, applying pressure to force said sections toward one another and against said solder, heating the sections and solder while maintaining said pressure, maintaining said pressure while the solder melts and confining it both on the inside and the outside of the inner section whereby to cause the solder to flow between the end portions of the sections, and then permitting the solder to cool and harden.

2. The method of brazing together tubular sections, the same comprising providing a section having an enlarged end portion, inserting a retaining member in said section having the enlarged end portion and positioning said retaining member to provide with said enlarged end portion an annular space, disposing solder in said space, inserting an end portion of a second tubular section into said space, applying pressure to force said sections toward one another and against said solder, heating the solder while maintaining said pressure whereby to cause the solder to flow between the end portions of the sections and the retaining member, and then permitting the solder to cool and harden.

3. The method of brazing together tubular sections, which comprises providing one of the sections with an internal enlargement having an annular shoulder at the inner end of said enlargement and telescoping the sections with the end of the other section in said enlargement adjacent said shoulder and with a supply of solder in the space between said end and the shoulder, applying pressure to force said shoulder and said end toward one another and against the solder, heating said solder while maintaining said pressure and at the same time confining the solder to force it to flow between the adjacent surfaces of the telescoping portions, and then permitting the solder to harden.

4. The method of brazing together tubular sections comprising providing a section having an internal shoulder from the end of the section, placing an L-shaped ring in the section with its lateral portion on said shoulder, placing a supply of solder between the ring and the section and inserting an end of a telescoping section between the ring and the first section and against said solder, applying pressure to force the end of the second section toward said shoulder and against the solder, and heating the solder while maintaining the pressure to force the solder to flow between the telescoping sections and between the ring and the second section.

5. In a device of the character described, two telescoping tubular sections, one of said sections having a shoulder adjacent the end of the other section, an L-shaped ring having its radial flange on said shoulder and its longitudinal portion adjacent the inner wall of the other section, and solder filling the spaces between the telescoping sections and between the ring and the second section.

6. The method of brazing together tubular sections, which comprises providing a section having a tubular end portion, inserting a retaining member in said tubular end portion and positioning said retaining member to provide with said tubular end portion an annular space, disposing solder in said space, inserting an end portion of a second tubular section into said space, applying pressure to force said sections toward one another and against said solder, heating the solder while maintaining said pressure whereby to cause the solder to flow between the end portions of the sections and the retaining member, and then permitting the solder to cool and harden.

JAMES R. COE.